United States Patent
Gentner et al.

(10) Patent No.: US 6,271,838 B1
(45) Date of Patent: *Aug. 7, 2001

(54) METHODS AND APPARATUS FOR A WINDOW PANE SASH CONTROL WITH MEMORY

(75) Inventors: Donald R. Gentner, Palo Alto; John Evans, Mountain View; Christopher Cotton, Belmont, all of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,147

(22) Filed: Jun. 30, 1998

(51) Int. Cl.$^7$ ................................................ G06F 13/00
(52) U.S. Cl. ................................................ 345/342; 345/340
(58) Field of Search .................................. 345/340, 121, 345/123, 341, 343, 346, 357, 973, 974, 333, 379, 342

(56) References Cited

U.S. PATENT DOCUMENTS 5,712,995 * 1/1998 Cohn ...................................... 345/342
5,771,042 * 6/1998 Santos-Gomez ...................... 345/342
5,999,178 * 12/1999 Hwang et al. ........................ 345/348

OTHER PUBLICATIONS

ACM Digital Library: "Simplified Applications for Network Computers", pp. 439–446, Mar. 1997.*

HotJava Views, MailView, pp., 1–2, Apr. 1998.*

Sun Microsystems, Inc. Unveils HotJava Views–First of its Kind, HotJava Views Provides Customizable Webtop Environment for Network Computers, Oct. 1996.*

* cited by examiner

Primary Examiner—Raymond J. Bayerl
Assistant Examiner—Tadesse Hailu
(74) Attorney, Agent, or Firm—Finnegan, Henderson, Farabow, Garrett & Dunner, L.L.P.

(57) ABSTRACT

Methods and systems for using a sash control graphic to resize panes in a window are disclosed herein. In the present invention, a sash control comprising at least one direction area and a drag area is used to resize panes in a display window. Information reflecting a first configuration of the panes within the window is stored. The panes may be automatically reset to the first configuration from a second configuration within the window based on the stored information in response to a single-action activation of the at least one direction area of the sash control without moving or dragging the sash control.

15 Claims, 6 Drawing Sheets

METHODS AND APPARATUS FOR A WINDOW PANE SASH CONTROL WITH MEMORY

BACKGROUND OF THE INVENTION

This invention relates generally to graphical user interfaces for computer systems and, more particularly, to methods and apparatus for manipulating the size and shape of window panes within a window in a graphical user interface.

Many modern computer systems employ graphical user interfaces that provide a separate "window" for each active task (as used herein, the term "task" includes but is not limited to both application programs and documents). Familiar examples include the Macintosh user interface from Apple Computer, Inc., and the Windows 95 user interface from Microsoft Corp. Such user interfaces facilitate computing because they provide a convenient way for a user to manage multiple tasks that are concurrently executing on the same computer.

Figure 1:
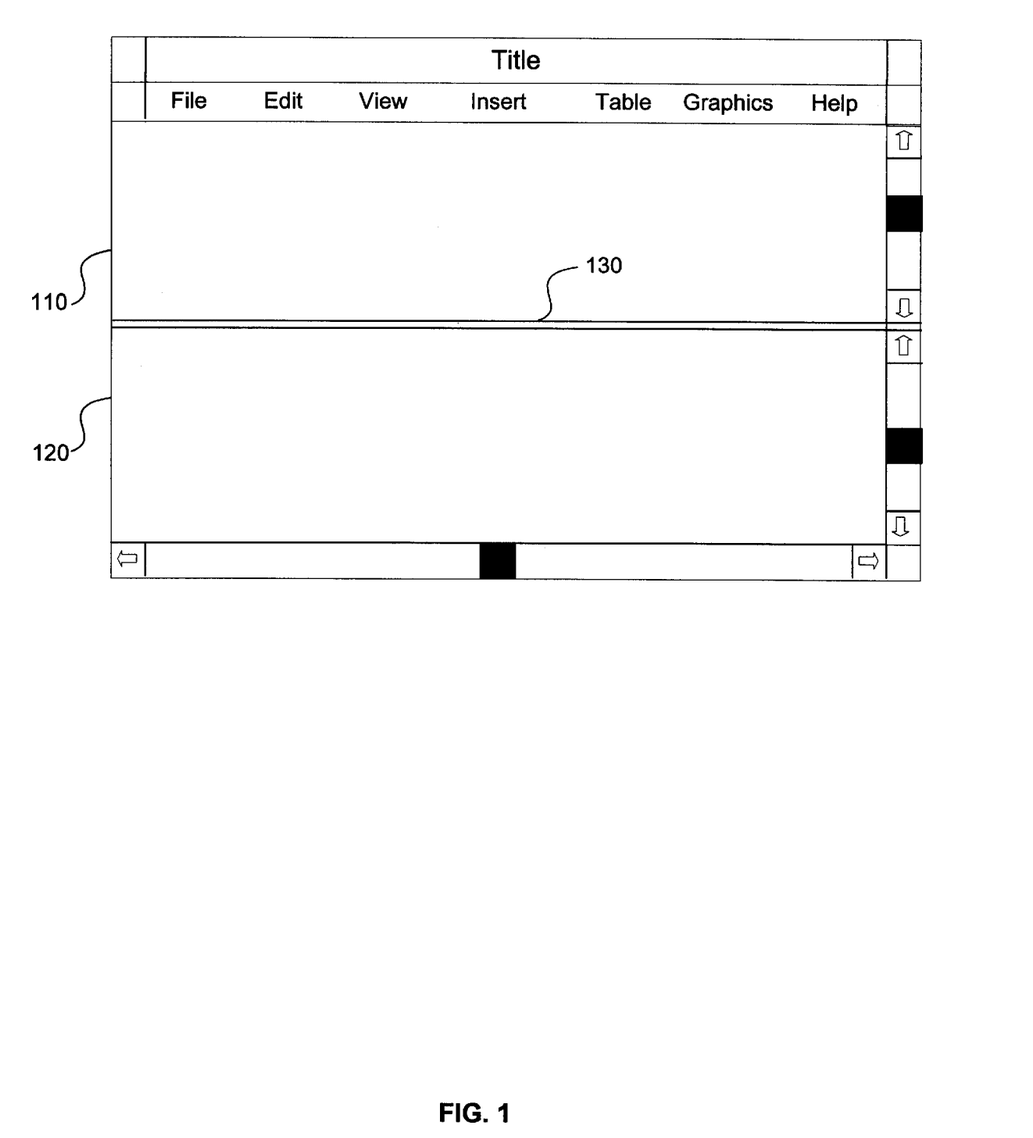
FIG. 1 is an example of a window with two panes.
Figure 2:
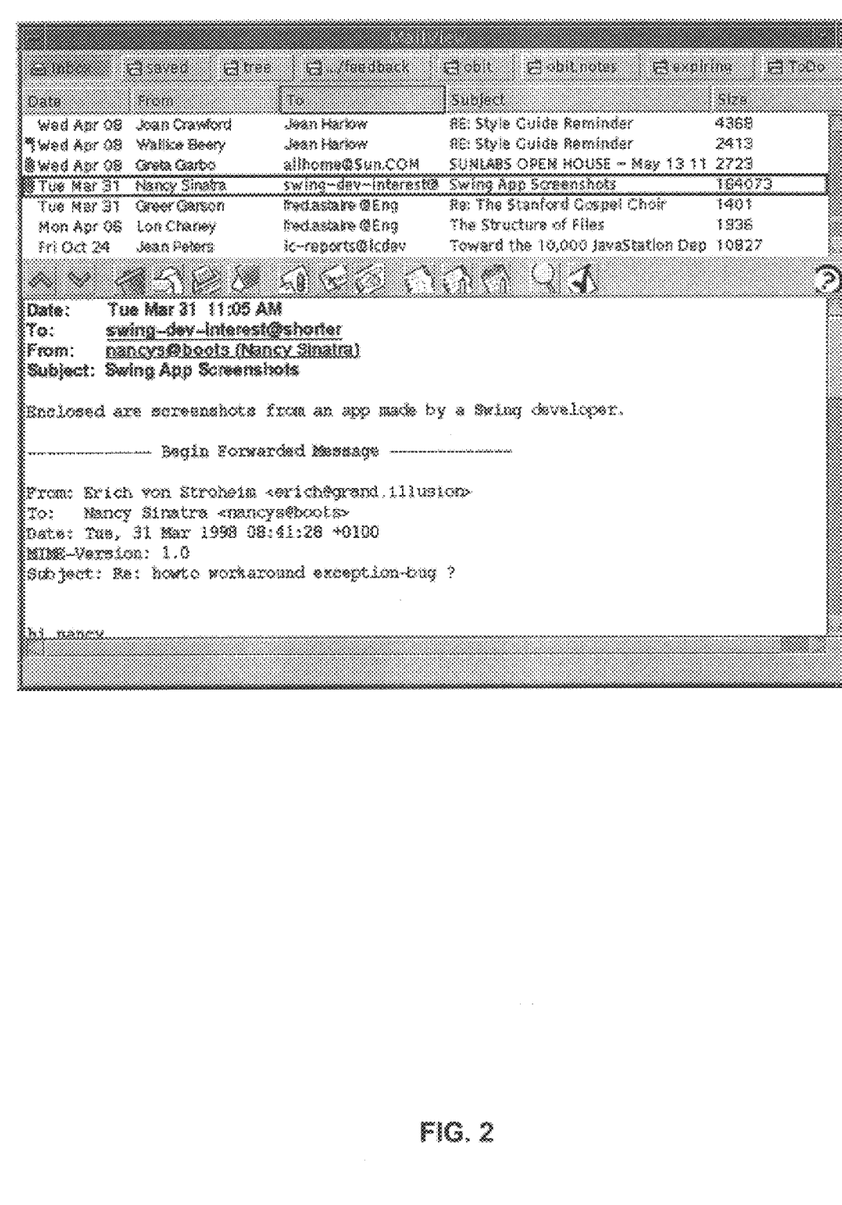
FIG. 2 illustrates a user interface screen showing a window with multiple panes and sash control consistent with the present invention.

A window can be further divided into smaller work areas or views within the window called "panes." FIG. 1 shows an example of a window that can be used with applications compatible with a windowing environment. FIG. 1 shows a window with two panes 110 and 120 separated by a horizontal border or "sash" 130. Panes allow a window to have multiple functions or multiple views visible on the screen at the same time. FIG. 2 illustrates an example of a window with two panes that can be used with an electronic mail application such as MailView™ by Sun Microsystems, Inc. As shown in FIG. 2, for example, the upper pane may contain a list of incoming e-mail while the lower pane may be used to view the text of one particular e-mail simultaneously. MailView™ is an application program in the HotJava Views™ suite of application programs that provides users with e-mail, calendaring, name directory access, and Internet browsing capabilities all written in Java™ programming language. Sun, Sun Microsystems, the Sun Logo, MailView, Hotjava Views, and Java are trademarks or registered trademarks of Sun Microsystems, Inc. in the United States and other countries.

Users can adjust the amount of space of each window that is devoted to each pane. Conventional methods allow users to position the mouse pointer over the sash between two panes, press and hold the mouse button, and drag the sash to a different position. The new position of the sash simultaneously enlarges one pane and reduces an adjacent pane.

There exist many drawbacks with current methods for resizing panes of a window. Existing methods, for example, do not remember the previous position of the sash once it has been moved to a new position. The user, therefore, must attempt to reestablish an earlier setting by estimating where the sash was positioned earlier and manually dragging the sash to that position. Dragging is a difficult skill for many people and locating the exact previous setting is difficult for most people. There is therefore a need for a system that allows a user to easily manipulate the size of panes in a window.

SUMMARY OF THE INVENTION

In accordance with one aspect of the present invention, as embodied and broadly described herein, a method for managing the display of windows in a computer system having a display for displaying the windows in connection with executing tasks comprises the operations of displaying a window containing at least two panes and a sash control; storing information reflecting a first configuration of the panes within the window; and resetting the panes to the first configuration from a second configuration within the window based on the stored information in response to activation of the sash control.

In accordance with another aspect of the present invention, an apparatus for managing the display of windows corresponding to tasks executable by a computer comprises a memory having program instructions, and a processor configured to use the program instructions to display a window containing at least two panes and a sash control; store information reflecting a first configuration of the panes within the window; and reset the panes to the first configuration from a second configuration within the window based on the stored information in response to activation of the sash control.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

FIG. 5 illustrates a user interface screen showing a window with two panes and sash control consistent with the present invention.

DETAILED DESCRIPTION

Systems and methods consistent with the present invention operate in a graphical user interface that supports applications that display windows with multiple panes. The systems and methods employ a sash control to resize panes in a window. If the sash is in an intermediate position, the position of the sash control and size of the windows is stored before the sash control is moved to facilitate quick return to a previous pane configuration.

Reference will now be made in detail to implementations consistent with the principles of the present invention as illustrated in the accompanying drawings. Wherever possible, the same reference numbers will be used throughout the drawings and the following description to refer to the same or like parts.

A. Method

Consistent with the present invention, a graphical user interface is provided for a user to manipulate the panes of a window. A graphical user interface, or GUI, lets users manipulate commands in a program graphically by using a pointing device, such as a mouse. To begin, an application displays a window containing two or more panes on a display device. FIG. 2 shows a GUI illustrating a view of the MailView application modified in accordance with principles of the present invention. Although any number of panes is possible, this particular view is separated horizontally into two panes, one vertically over the other. Along the right hand side, a sash control consistent with the present invention is displayed for manipulating the size of the panes within the window.

Figure 3A:
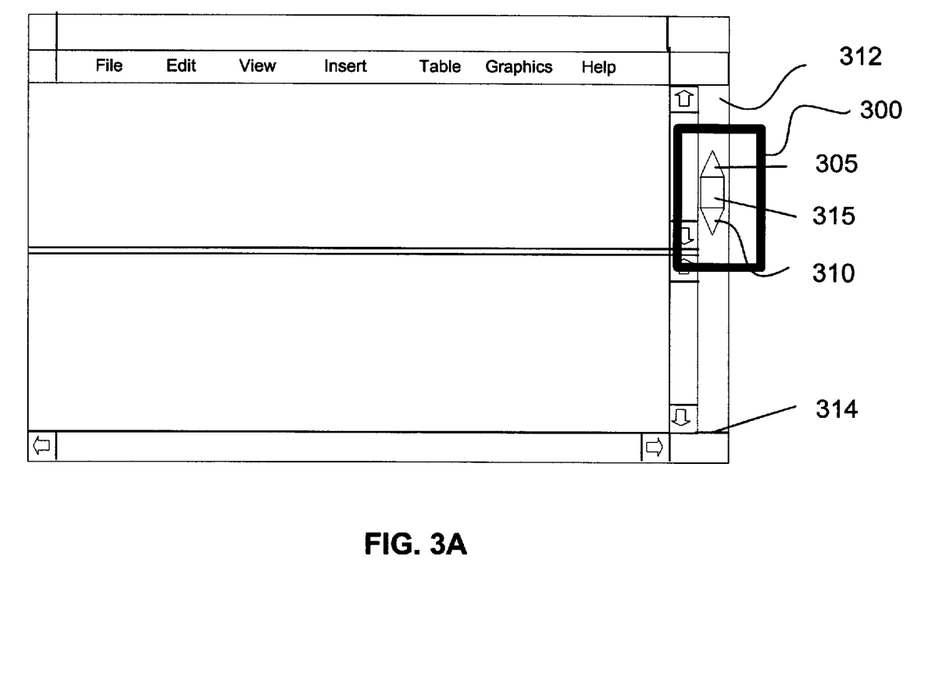
FIGS. 3A and 3B illustrate user interface screens showing sash controls consistent with the present invention.
Figure 3B:
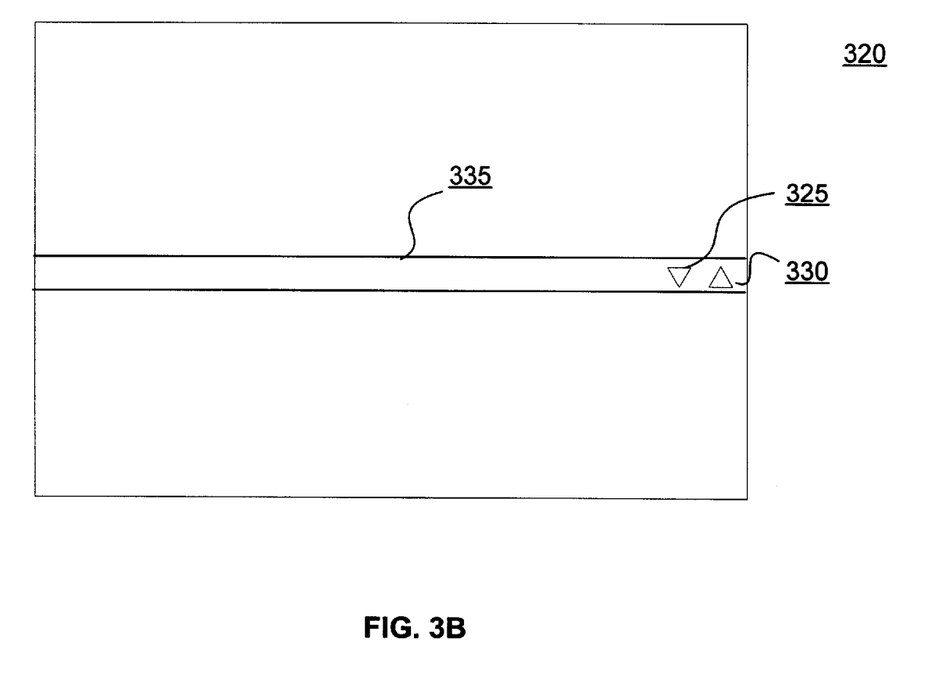

The sash control is implemented as a graphic appearing on the screen. The graphic, which may be any shape, size, or color, includes one or more of the following areas. A first direction area is used for indicating movement in one orthogonal direction (such as up or left). A second direction area is used for indicating movement in the corresponding opposite orthogonal directions (such as down or right). A drag area is used for indicating movement back and forth in both orthogonal directions. In one implementation consistent with the principles of the present invention, the sash control is implemented as shown in FIG. 3A. Sash control 300 contains direction area 305, also referred to as arrow 305, direction area 310, or arrow 310, and drag area 315. Numbers 312 and 314 point to extreme positions of a vertical sash control panel. An extreme position is the farthest point in an orthogonal direction, such as at top 312 or bottom 314. At an extreme position, one of the window panes is fully enlarged and another is fully hidden, or collapsed. If the sash control panel is in a horizontal orientation, an extreme position may be to the far left or right of a horizontal sash control panel. FIG. 3B shows another example of a sash control consistent with the present invention. Sash control 320 contains direction area 325, direction area 330, and drag area 335.

Figure 4:
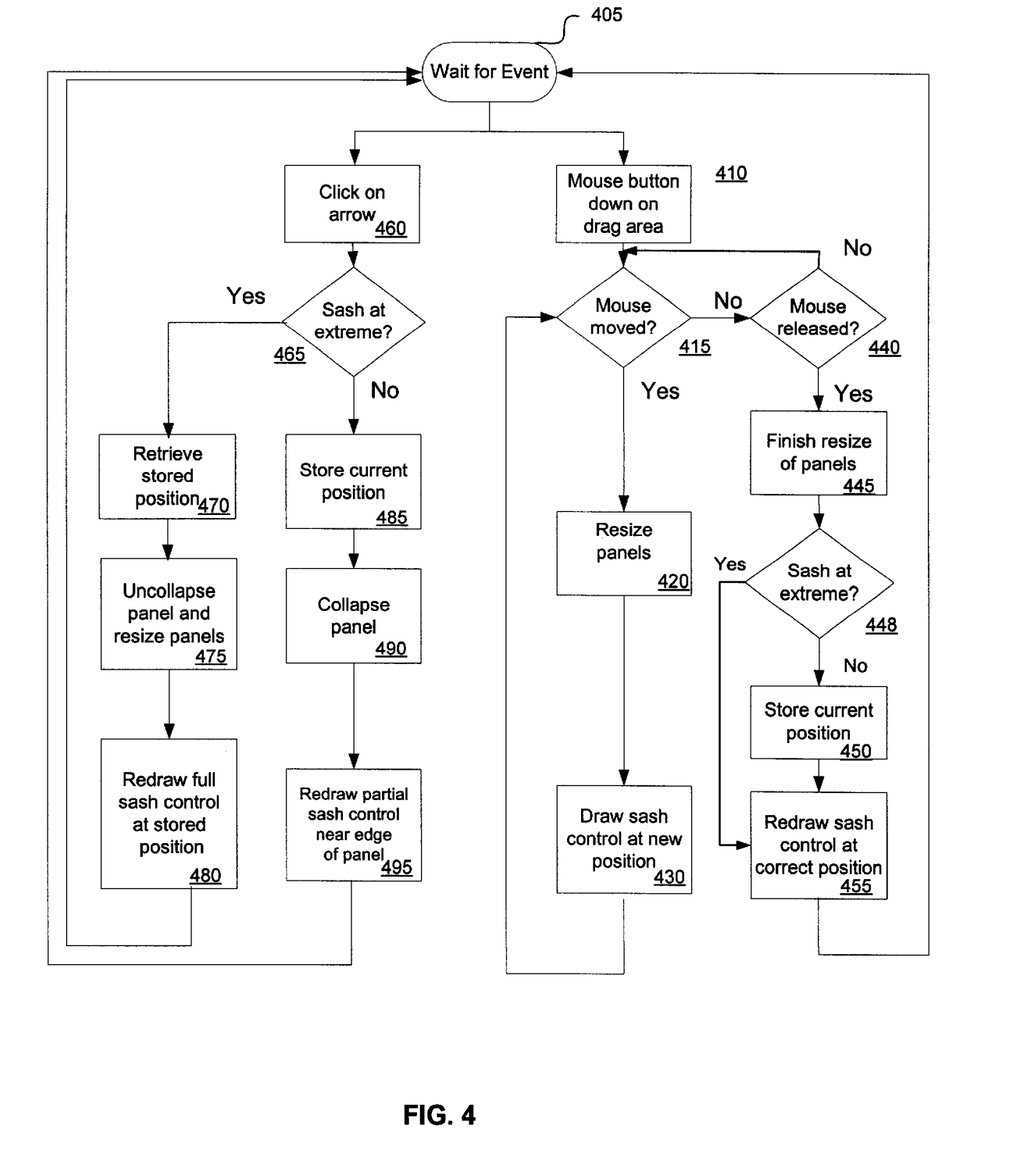
FIG. 4 is a flow diagram of operations performed to operate a window with multiple panes consistent with the present invention.

FIG. 4 is a flow diagram of operations performed to resize a window pane area using a sash control consistent with the present invention. The procedure begins with the application displaying a window with a sash control. To begin, the application is waiting for an event (state 405). The event may be, for example, the user indicating with a mouse either direction areas 305, 310, 325 or 330 or drag areas 315 or 335 of FIGS. 3A and 3B. For ease of explanation, the following example will refer only to sash control 300 in FIG. 3A.

If the user presses and holds down the mouse button while on drag area 315 (state 410), the application checks to see if the mouse is moved (state 415). If the mouse is moved, the application moves the sash control in a direction consistent with the mouse movement. The application also resizes the window panes according to the movement of the sash control (state 420). If, for example, the sash control in FIG. 3A is moved down along a vertical sash control panel, the window pane whose upper border is parallel with the sash control is made smaller by moving the upper border down the same amount of movement as the sash control. Simultaneously, the window sash that has lower border parallel with the sash control is made larger by moving the lower border down an amount corresponding with the movement of the sash control. The sash control is redrawn at the new position (state 430).

The application continues to look for movement of the mouse (state 415) and resize the window panes accordingly (states 420 and 430) until the mouse button is released (state 440). When the mouse is released, the window panes are resized for a final time (state 445). If the sash control is not at an extreme position of the pane (state 448), the position of the sash control is stored (state 450). If the sash control is at an extreme position of the pane, the position of the sash control does not need to be stored. In any case, the sash is redrawn at the correct position (state 455) and the application waits for the next event (state 405).

Another type of event occurs when the user clicks on direction area 305 or 310 in FIG. 3A (state 460). The application checks to see if the sash control is at an extreme position (state 465). FIG. 5 illustrates an example of a MailView application with a sash control in an extreme position so one of the window panes is collapsed. As shown, the upper pane is enlarged to fill the entire window area. The lower pane is completely invisible. If the sash control is in an extreme position, the sash control graphic may be modified to show that it is only possible to move the sash in one direction. For example, in FIG. 5 the sash control in the circle in the lower right corner is depicted as only the drag area and one direction area.

Returning now to FIG. 4, if the sash control is in an extreme position (state 465), the application retrieves from storage the last stored position of the sash control (state 470). The application then resizes the window panes so that the upper border of the lower pane and the bottom border of the upper pane are situated at the last stored position (state 475). The application redraws the full sash control to appear in a position corresponding to the position retrieved from storage (state 480).

When the user selects direction area 305 or 310 in FIG. 3A (state 460) and the sash is not at an extreme position (state 465), the application collapses one pane so that the other pane is fully displayed. The application stores the current position of the sash control (state 485) and collapses the pane to its full extreme in the direction of the arrow that was indicated (state 490). For example, if the lower arrow was indicated, the lower border of the upper pane is move to the far extreme at the bottom of the window and the upper pane fully occupies the window. Simultaneously, the upper border of the lower pane is moved to the far extreme at the bottom of the window so that the lower pane is completely hidden. The sash control is redrawn at the extreme position (state 495). The sash control may be modified to appear as only a drag area and one arrow indicating to the user that future movement is possible in only one direction.

B. Architecture

Figure 6:
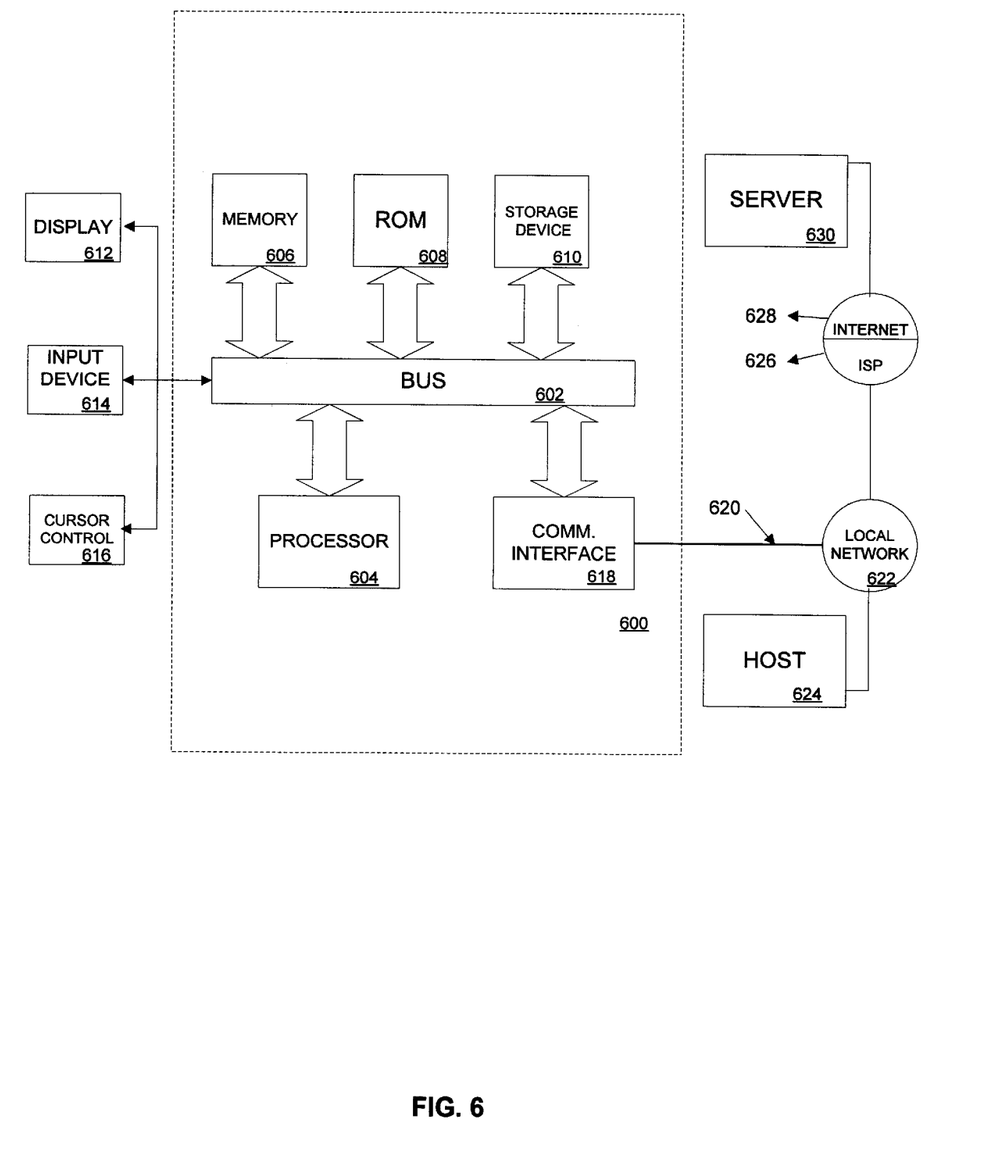
FIG. 6 is a block diagram of a computer system in which systems consistent with the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a memory 606, which can be a random access memory (RAM) or other dynamic storage device, coupled to bus 602 for storing information, such as information reflecting pane configurations, and instructions to be executed by processor 604. Memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

An embodiment of the present invention uses a computer system 600 for resizing panes of a window using a sash control with memory. Consistent with one implementation of the invention, information from the multiple remote resources is provided by computer system 600 in response to processor 604 executing one or more sequences of one or more instructions contained in Memory 606. Such instructions may be read into Memory 606 from another computer-readable medium, such as storage device 610. Execution of the sequences of instructions contained in Memory 606 causes processor 604 to perform the process states described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as Memory 606. Transmission media includes coaxial cables, copper wire, and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector coupled to bus 602 can receive the data carried in the infra-red signal and place the data on bus 602. Bus 602 carries the data to memory 606, from which processor 604 retrieves and executes the instructions. The instructions received by memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to local network 622. For example, communication interface 618 may be an integrated services digital network (ISDN) card or a modem to provide a data communication connection to a corresponding type of telephone line. As another example, communication interface 618 may be a local area network (LAN) card provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 and/or to data equipment operated by an Internet Service Provider (ISP) 626. ISP 626 in turn provides data communication services through the Internet 628. Local network 622 and Internet 628 both use electric, electromagnetic, or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the present invention, one such downloaded application allows a user to easily resize panes of a window using a sash control with memory, as described herein. The received code may be executed by processor 604 as it is received, and/or stored in storage device 610, or other non-volatile storage for later execution. In this manner, computer system 600 may obtain application code in the form of a carrier wave.

Although computer system 600 is shown in FIG. 6 as being connectable to one server, 630, those skilled in the art will recognize that computer system 600 may establish connections to multiple servers on Internet 628. Additionally, it is possible to implement methods consistent with the principles of the present invention on other device comprising at least a processor, memory, and a display, such as a personal digital assistant. Furthermore, it is possible to implement methods consistent with the principles of the present invention using object-oriented facilities like the Java™ Development Kit from Sun Microsystems, Inc., which provides a set of classes for configuring user interfaces.

C. Conclusion

As described in detail above, methods and apparatus consistent with the present invention allow a user to easily resize panes of a window using a sash control with memory. The foregoing description of an implementation of the invention has been presented for purposes of illustration and description. Modifications and variations are possible to the processes described in connection with FIG. 6 in light of the above teachings or may be acquired from practicing the invention.

Although systems and methods consistent with the present invention are described as operating in the exemplary distributed system, one skilled in the art will appreciate that the present invention can be practiced in other systems and programming environments. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for managing the display of windows corresponding to tasks executable by a computer on a display, the method comprising the operations of:

displaying a window containing at least two panes and a sash control, wherein the sash control comprises at least one direction area and a drag area;

storing information reflecting a first configuration of the panes within the window; and automatically resetting the panes to the first configuration from a second configuration within the window based on the stored information in response to a single-action activation of the at least one direction area of the sash control without moving or dragging the sash control.

2. The method of claim 1, wherein the first configuration of the panes within the window comprises a configuration where at least one of the at least one panes is fully open and another pane is fully hidden and wherein the activation of the sash control comprises indicating the at least one direction area.

3. The method of claim 1, wherein the first configuration of the panes within the window comprises a configuration where the panes are partially open and the second configuration comprises a configuration where at least one pane is fully open and another pane is fully hidden and wherein the activation of the sash control comprises activation of the at least one direction area.

4. The method of claim 1, wherein the operation of resetting the panes comprises:

displaying the panes in the first configuration.

5. A computer-readable medium containing instructions for managing the display of windows corresponding to tasks executable by a computer, by:

displaying a window containing at least two panes and a sash control, wherein the sash control comprises at least one direction area and a drag area;

storing information reflecting a first configuration of the panes within the window; and automatically resetting the panes to the first configuration from a second configuration within the window based on the stored information in response to a single-action activation of the at least one direction area of the sash control without moving or dragging the sash control.

6. The computer-readable medium of claim 5, wherein the first configuration of the panes within the window comprises a configuration where at least one of the at least one panes is fully open and another pane is fully hidden and wherein the activation of the sash control comprises activation of the at least one direction area.

7. The computer-readable medium of claim 5, wherein the first configuration of the panes within the window comprises a configuration where the panes are partially open and the second configuration comprises a configuration where at least one pane is fully open and another is fully hidden and wherein the activation of the sash control comprises activation of the at least one direction area.

8. The computer-readable medium of claim 5, wherein the operation of resetting the panes comprises:

displaying the panes in the first configuration.

9. An apparatus for managing the display of windows corresponding to tasks executable by a computer, comprising:

a memory having program instructions, and a processor configured to use the program instructions to:

display a window containing at least two panes and a sash control, wherein the sash control comprises at least one direction area and a drag area;

store information reflecting a first configuration of the panes within the window; and automatically reset the panes to the first configuration from a second configuration within the window based on the stored information in response to a single-action activation of the at least one direction area of the sash control without moving or dragging the sash control.

10. The apparatus of claim 9, wherein the first configuration of the panes within the window comprises a configuration where at least one of the at least one panes is fully open and another pane is fully hidden and wherein the activation of the sash control comprises activation of the at least one direction area.

11. The apparatus of claim 9, wherein the first configuration of the panes within the window comprises a configuration where the panes are partially open and the second configuration comprises a configuration where at least one pane is fully open and another pane is fully hidden and wherein the activation of the sash control comprises activation of the at least one direction area.

12. The apparatus of claim 9, wherein the processor configured to reset the panes is further configured to display the panes in the first configuration.

13. An apparatus for managing the display of windows corresponding to tasks executable by a computer, comprising:

means for displaying at least one window containing at least two panes on the display;

means for displaying a sash control graphic in a first position on the display, the sash control graphic comprising at least one direction area and a drag area;

means for displaying a window containing at least two panes and a sash control;

means for storing information reflecting a first configuration of the panes within the window; and means for automatically resetting the panes to the first configuration from a second configuration within the window based on the stored information in response to a single-action activation of the at least one direction area of the sash control without moving or dragging the sash control.

14. A graphical user interface for managing the display of a window comprising at least two panes displayed by a computer comprising a processor, a memory, and a display, the graphical user interface comprising at least one direction area and a drag area, wherein activation of the direction area without moving or dragging the direction area causes a computer to perform the operations of:

storing information reflecting a first configuration of the panes within the window; and displaying the panes in a second configuration where at least one of the panes is fully open and another pane is fully hidden.

15. The graphical user interface of claim 14, wherein activation of the direction area causes a computer to perform the operation of:

retrieving stored information reflecting a first configuration of the panes within the window; and resetting the panes to the first configuration from a second configuration within the window based on the stored information.

* * * * *